United States Patent Office 2,962,461
Patented Nov. 29, 1960

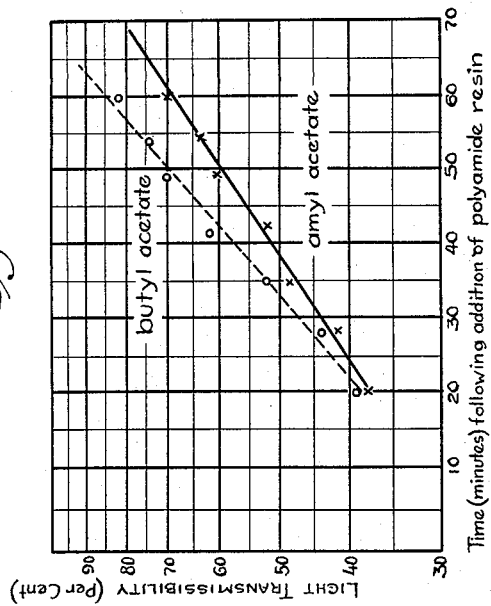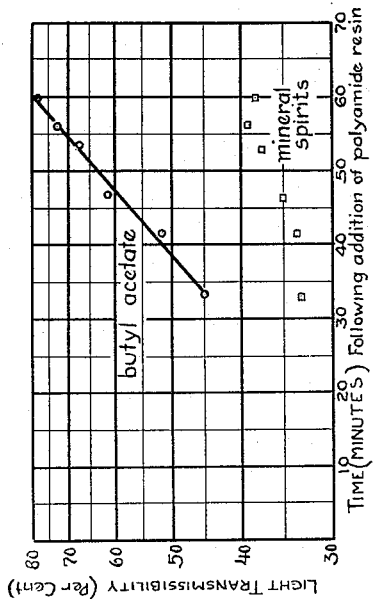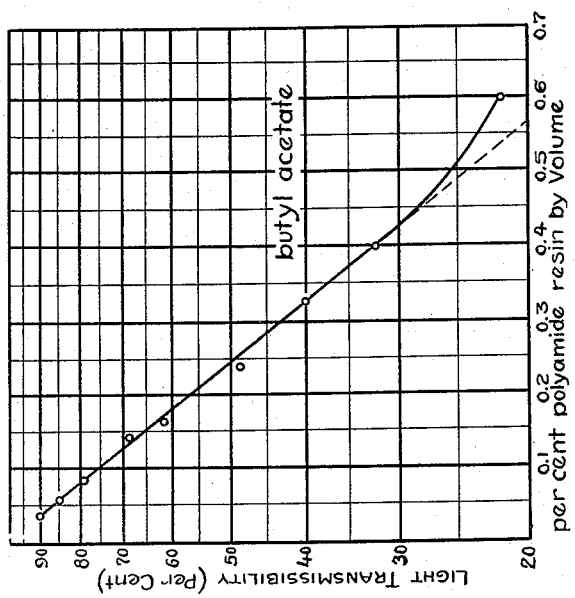

2,962,461

METHOD FOR DETERMINING END POINT OF POLYAMIDE MODIFIED VEHICLE COOKS

Norbert F. Toussaint, Skokie, and Taki J. Anagnostou, Chicago, Ill., assignors to T. F. Washburn Company, Chicago, Ill., a corporation of Delaware Filed Nov. 30, 1956, Ser. No. 625,322

10 Claims. (Cl. 260—22)

This invention relates to technical aspects of the production of polyamide modified ester body vehicles having thixotropic properties and suitable for use in paints, varnishes, inks and the like, and more particularly to a method for predicting and determining the end point of the cooking process for digestion or dispersion of the polyamide resin in the ester body base material, this end point being short of completion of the digestion process and critical of determination for achievement of the desired properties in the thixotropic vehicle product.

The production control method of this invention pertains to the process and product of Winkler Patent No. 2,663,649, dated December 22, 1953. While the vehicle materials of this patent have for several years been, and currently are being, produced commercially in large quantities, the problem of determining the exact time at which the cook should be discontinued in the production of the vehicle materials has persisted as one which, while not preventing the commercial production of satisfactory products, has resulted in greater than desirable departure from products having optimum physical and chemical properties and, in some instances, additional expense due to spoiled batches. As the Winkler patent discloses in greater detail, and as subsequent investigation has confirmed and shed additional light on the nature of the product of the patent and the process by which it is made, the polyamide modified vehicle is in the physical form of a disperse system which appears to be responsible for the thixotropic properties of the composition. In the digestion process which progresses during the course of the cook following addition of the polyamide resin to the base materials in the kettle, the polyamide, being normally insoluble in and incompatible with the ester body base materials, is gradually dispersed, the proportion of polyamide resin which is digested and thus assimilated into the ester body base material to the undigested polyamide resin gradually increasing with the passage of time as the cook is maintained at elevated temperature. However, as the Winkler patent sets forth in considerable detail, the digestion process must not be permitted to continue to completion for the reason that the desirable thixotropic properties of the finished vehicle material depend upon the existence of a disperse system, over-cooking resulting in a clear and soupy liquid which does not exhibit the desirable thixotropic properties. Insufficient digestion, on the other hand, results in a grainy product which is not only difficult to filter properly but also lacks the desired degree of thixotropy. Other properties of the finished paint or other product, such as degree of gloss, syneresis, etc., in addition to thixotropy, are affected by the degree of completion of the cook.

It will be understood, accordingly, that the cook must be very carefully controlled, especially with respect to the time at which the cooking process is discontinued, it being assumed that the proper temperature will be maintained. Standardization of cooking time is not sufficient to achieve standardization of the digestion product of the cook, many variables, such as acid number, variations in the reactivity of base materials, especially of the alkyd condensation products, and non-uniformity of the polyamide resin materials, affect the rate of digestion reaction, so that the cook time must be adjusted due to such variables to achieve the desired vehicle product. The cook control method herein described is not affected by such variables, or, otherwise stated, takes them into account in indicating the end point time.

While this end point is quite critical with respect to a particular cook to obtain a particular product, it should be recognized that different desired end product properties require somewhat different degrees of digestion of the polyamide resin in the ester body base material, so that the production of the line of polyamide modified vehicles contemplates a range of cook end points. The essential consideration is that a particular result shall be reproduceable again and again in successive production cooks with reliability and accuracy so that the product will have the desired predetermined properties.

The Winkler patent carefully specifies a test, therein referred to as a "cloud test," for determining when the batch being cooked has reached the desired end point. In carrying out this test, a one part sample of the cook is mixed with nine parts of mineral spirits, heated and then cooled to room temperature. If this mixture, when compared to a previously prepared standard, shows no graininess and has maximum turbidity and a cloudy appearance, the cooking end point has been reached and the cook is discontinued. While this test has been used in the commercial production of the vehicle materials in accordance with the Winkler patent, it has the inherent shortcoming of depending upon human judgment and experience in observing the sample and comparing it with a standard or, in the case of an experienced operator, with a mental picture of the standard. Also, it has not been possible to predict with any degree of certainty the time of the cook end point from the appearance of the mineral spirits mixtures of samples taken during early stages of the cook. Under these conditions a relatively large number of tests must be made in order to control the process so that the material is neither under- nor over-cooked.

The principal object of the present invention is to provide an improved and certain method of determining a pre-established cook end point by determining the degree of completion of the process of digestion of the polyamide resin in the cook in the production of vehicle materials of the type described in the above-identified Winkler patent. A further object of the invention is to provide a method for predicting the time of a pre-established end point of the cook containing ester body base material and polyamide resin in the production of the Winkler type of thixotropic vehicle material by means of a minimum number of sample tests and extrapolation of a graph prepared from such tests. As an important part of this objective, a method including particular solvent systems is provided whereby the graph used in predicting the end point of the cook is a straight line, it being understood that the linear relationship is desirable for convenience and accuracy of extrapolation, but not essential to the successful operation of the method.

All of the several objects of the invention contemplate the production of thixotropic vehicle materials, of the type disclosed in the Winkler patent, of more certain uniformity and quality. The many advantages of the production control method herein disclosed will become apparent as the detailed description thereof proceeds.

In the accompanying drawing,

Figs. 1 and 2 show representative graphs for different solvent systems to illustrate the relationship of light transmissibility and elapsed digestion time of cook test samples prepared as described hereinafter, corresponding data for mineral spirits mixtures being shown on Fig. 1 for comparison purposes, and Fig. 3 shows the Beer's law behavior of a preferred solvent useful for the purposes of the invention.

Careful study of the processes and products described in Winkler Patent No. 2,663,649 have shown that, for a given cook recipe, such properties as degree of thixotropy and clarity of the finished products of the cook are related to the concentration of undigested polyamide resin present in substantially colloidal form in the material. The cook, as is explained in greater detail in the patent referred to, comprises selected base material, such as an alkyd resin, ester oils, varnish ester bodies, or other vehicle base material or mixtures thereof, and a polyamide resin of the type described in the patent. Among the resin bases which are suitable in which to disperse the polyamide resin are alkyd resins such as the reaction product of a polybasic acid with a polyhydric alcohol, either unmodified or modified by the incorporation of vegetable oils, fatty acids, or natural or synthetic resins. Natural ester oils, synthetic ester oils, and varnish ester bodies may also be utilized. Some examples are varnishes, ink and paint vehicles made by esterification of oil acids or oil and resin acids with a polyhydric alcohol. Additionally, oleoresinous varnish or paint vehicles formed by the dispersion of an oil-soluble natural or synthetic resin in a drying oil with heat may be used. Other suitable bases are the natural vegetable oils.

A typical alkyd resin may be prepared by heating 320 grams refined soybean oil with 90 grams of glycerine and 0.25 gram of sodium hydroxide as catalyst together under agitation and $CO_2$ blanket to 460° F. This temperature is held for alcoholysis, determined by any conventional test, such as clarity of solution containing one part of base and 4 parts of alcohol. There are then added 247 grams phthalic anhydride. The mixture is heated to 465° F. and 30 grams of glycerine are then added. This mixture is reheated to 480° F. and held for viscosity W to X and acid number below 10.

Natural ester oils such as refined soya or linseed oils may be reacted directly with the polyamide resin to form a product according to the present invention.

Varnish ester bodies suitable for the present invention may be prepared by heating 1000 grams refined or distilled tall oil having 50 to 60 percent fatty acids to 410° F., adding 173 grams tripentaerythritol, and heating to 560° F. until an acid number of 10 is reached. Still another varnish ester body may be prepared by heating 100 grams of a resin-modified phenol-aldehyde resin such as "Amberol M–93" and 156 grams of tung oil to 560° F., and holding the temperature until the desired viscosity is reached. Numerous other similar products known to the art may also be used. In commercial production, the hard, thermoplastic form of polyamide resin manufactured and sold by General Mills, Inc., under the trademark "Versamid," types 900, 930, 940 and 950, have been generally used. "Versamids" are prepared by the condensation of polymerized linoleic acid with polyamines according to the following equation:

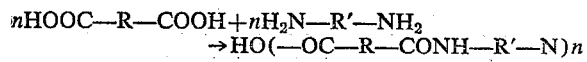

R, R' and n in the equation above vary in the different grades of "Versamids." Of the grades referred to above, "Versamid 900" is a hard, brittle, high melting point resin. "Versamid 930" and "Versamid 940" are tough resins more flexible than "Versamid 900." "Versamid 950" is a specially compounded form of "Versamid 940." The polyamide resin is a minor constituent of the cook. Maintenance of the cook at an elevated temperature results in the gradual dispersion or digestion of the polyamide resin in the base material, apparently to form an interchange digestion product. Thus, the concentration of undigested polyamide resin in the cook gradually decreases. The problem is to determine the time at which the cook should be discontinued, indicated by the optimum concentration of undigested polyamide resin in the cook at which point the finished product will have the desired physical and physical-chemical characteristics.

It has been found that with a certain class of solvents, a suspension having stable and reproduceable optical characteristics may be formed from a sample of the cook and, by measuring the light transmissibility of such suspension, this being an index of the concentration of undigested polyamide resin and thus an indication of the status of interchange reaction between the polyamide resin and ester body base material, the degree of completion of the digestion process of the cook is indicated. By making a series of such determinations by means of a succession of samples withdrawn from the kettle as digestion proceeds, and having previously measured the light transmissibility of a suspension formed from the finished product of a previously completed cook to pre-establish a transmissibility target, the operator can be kept fully informed as to the progress of the digestion and can determine the time at which cooking must be discontinued and the batch dumped into the thinning tanks with consequent termination of the cook reaction.

In essence, each determination is made by dissolving with heat a sample of the cook in a solvent in which the base material and digestion product are soluble both hot and cold and which forms a solution therewith having appreciable solubility of the undigested polyamide resin when hot but substantial insolubility when cold, cooling the solution to precipitate the undigested polyamide resin contained therein to form a suspension of this precipitated resin in the solution, and measuring the light transmissibility of the suspension as an index to the degree of completion of the digestion of the polyamide resin in the cook. It will be understood, of course, that all factors must be carefully standardized and the relative amounts of the cook sample and solvent selected to bring about the dissolution of at least a substantial proportion of the undigested polyamide resin at the elevated temperature and to assure a suspension, when cold, having a measurable optical density within the useful range of the instrument to be employed in the measurement of the transmission of light through the suspension.

It has been found that as a practical matter a suspension useful for measuring light transmissibility for the purposes of the invention may be prepared by dissolving in a suitable solvent a sample taken from the cook in an amount sufficient to provide a solution containing, preferably, from two to thirty percent, by weight, of the material of the cook. The relative proportions of cook material and solvent used depend upon the nature of the material and solvent and must be suited to the type of instrument used for measuring light transmissibility. It is necessary that the phases of the cook sample which include the ester body base material and the reaction or digestion product of some or all of this base material with the polyamide resin, be completely soluble in the solvent at room temperature as well as at elevated temperature. For most cooks, the optical effect of this solution remains substantially constant for all samples taken during the progress of the cook; consequently, the light transmission measurements reflect only undigested polyamide content. A suitable colored filter is usually used to compensate for or obviate the effect of color in the sample when the content of the cook is such that appreciable color change takes place prior to attainment of the end point, but this is not entirely necessary since, in this respect, a particular combination of batch ingredients manifest substantially the same color changes so that the cook end point may be determined on the basis of previous experience and, desirably, a pre-established experience graph prepared from measurements taken in connection with a previous cook.

With reference to the undigested polyamide resin in the cook, the solvent solution, in the concentration used to prepare the test suspensions, should dissolve, at the elevated temperature, at least a substantial proportion of the resin present in the sample to insure the production of a suspension having optical density characteristics related to the undigested polyamide resin in the sample. Greater accuracy is achieved if the solvent and concentration thereof are selected so that, as the end point of the cook is approached, substantially all of the resin is dissolved with heat and a substantial portion thereof reprecipitated upon cooling to provide measurable optical density. While the dimensional characteristics of the undigested polyamide resin contained in the cook are somewhat haphazard, dissolution and subsequent precipitation results in reasonably dependable uniform particles in the suspension under the conditions of formation of the suspension herein described. It will be understood that slight solubility of the undigested polyamide resin in the continuous phase of the suspension will not appreciably impair the dependability of the light transmissibility measurements since all samples of a series contain the same quantity of solvent and therefore will hold in solution only a fixed, and small, quantity of the resin.

Preferably, the solvent used in the preparation of the test suspension should be one which, together with the base material solute, furnishes a system which follows Beer's law in the test range of concentrations employed. The advantage of such a system, in which concentration of the precipitated undigested polyamide resin in the suspension is proportional to the optical density of the suspension, lies in the convenient means which it offers for checking the dependability of other determinations of the series of samplings and for predicting the time at which the digestion of the polyamide resin will have proceeded to the desired extent for the cook to be discontinued. Since optical density of the suspension is proportional to the logarithm of light transmissibility of the suspension, the graph of the concentration-transmissibility relationship, when plotted on semi-logarithmic paper, is linear. Since, as has been discovered, the rate of digestion of the polyamide resin by the base material in the cook is constant when digestion conditions, such as temperature, are maintained constant, the relationship between time and concentration of undigested polyamide resin in the cook is also linear. Consequently, the graph of the time-transmissibility relationship, when plotted on semi-logarithmic paper, is linear, and the plotting of two determinations to establish the slope of the line on the semi-logarithmic paper will indicate the time at which the digestion process will have progressed to the desired end point as indicated by the previously determined target level of light transmissibility of a suspension prepared from a sample of a finished vehicle product having the desired properties.

Fig. 3 shows the graph of the relationship of light transmissibility and concentration of polyamide resin in a butyl acetate, a preferred solvent for the purposes of the invention. The linear relationship indicates that this system follows Beer's law until the concentration of the resin in the solvent exceeds about 0.45%, by volume.

The following solvents have been found to be suitable for the purposes of the invention and to provide solvent systems, when used in proper concentrations, which follow Beer's law:

Butyl acetate,
Amyl acetate,
Ethylene glycol monomethyl ether,
Ethylene glycol monoethyl ether,
Diethylene glycol monomethyl ether,
Diethylene glycol monoethyl ether,
Methyl ethyl ketone,
Cellosolve acetate (ethylene glycol monoethyl ether acetate),
Tetrahydrofurfuryl alcohol,
Dipropylene glycol methyl ether.

These solvents are specified by way of example, and other solvents are known or may be found to be useful. The behavior of any solvent from the standpoints of solubility of polyamide resin hot and the formation of optically suitable suspensions when cooled, and therefore utility for the purposes of the invention, may readily be determined by simple experimentation. It will be understood that the preferred solvents are those which exhibit relatively large positive coefficients of solubility of polyamide resin.

A suitable instrument for the measurement of light transmission through the sample suspensions is the Lumetron colorimeter, model 401, or equivalent. This instrument is equipped for the use of color filters. The specimen tube must, of course, be properly matched.

By way of more complete description of the invention and the preferred manner in which it is used, the following specific examples are given. It should be understood that a target must be established in advance of the production cook to indicate the desired end point of the cook. This target must be pre-established for each cook recipe. It is the light transmissibility of a suspension prepared from a previously finished vehicle digestion product having the desired thixotropic and other properties, the object of the production cook being to duplicate the finished vehicle product. The same solvent must be used in the target determination as is used in connection with the control of the production cook.

*Example 1*

The cook contains 95.4%, by weight, of a medium oil alkyd base material and 4.6% polyamide resin. The cooking time for the optimum degree of digestion of the polyamide resin is known to be in the neighborhood of one hour when the cook has been maintained at a temperature of approximately 450° F. To check the progress of digestion of the resin, a sample of the cook is withdrawn from the kettle and the time of withdrawal is noted. This may be done, for example, about thirty minutes after addition of the polyamide resin to the cook. Ten grams of this sample is poured into a beaker, 90 grams of butyl acetate is added to the sample in the beaker, and the mixture is heated to approximately 150° F., and stirred until substantial dissolution is indicated by substantial clarity of the contents of the beaker. The weight of the solution is checked and sufficient butyl acetate added to make up for any loss during dissolution of the sample. The solution is poured into a colorimeter specimen tube and cooled to room temperature. A suspension is formed with precipitated undigested polyamide resin as the disperse phase. The sample then is placed into the colorimeter equipped with a 550 millimicron color filter and the light transmissibility of the suspension contained in the colorimeter tube measured.

If the sample was taken from the kettle at a time prior to the desired end point of the cook, as it normally would be, and if the effect of increasing color, if any and appreciable, is avoided by the use of a suitable color filter, the light transmissibility of the sample suspension would be less than that of the target, indicating that the cook has not yet reached the desired end point. The magnitude of the light transmissibility, as a single measurement comparable with the target, also gives a semi-quantitative indication of the extent to which the digestion has progressed. In order to prognosticate with a reasonable degree of accuracy the time at which the digestion of the particular cook will have reached the desired end point, another sample is withdrawn from the kettle after a suitable interval, say ten minutes, has elapsed following the previous sampling, and the light transmissibility of a suspension prepared from this sample in the manner above described, is measured. Sampling times and light transmissibility of the respective samples are then plotted on semi-logarithmic paper, the logarithmic scale being used for transmissibility expressed, conveniently, in percent. Unless the first sample of the material was taken too early in the cooking process so that the suspension is very dense, the relationship of time and optical density or time and logarithm of light transmissibility is linear, and a straight line drawn through the two points plotted on the semi-logarithmic paper, extended, will indicate, at the intersection of the straight line graph with the ordinate representing the target transmissibility, the approximate end point of the cook. One or more additional samples may be taken and the light transmissibility of suspensions prepared therefrom measured for check purposes and, if desired, to confirm the indicated end point just prior to dumping the cook. The optimum digestion end point of a typical medium oil alkyd base is that which would be indicated by an end point target transmissibility of a butyl acetate solvent suspension of approximately 80% when a 550 millimicron color filter is used with the light source.

*Example 2*

The cook consists of 97.6%, by weight of a long oil alkyd type base material and 2.4% polyamide resin. The progress of digestion of the polyamide resin may be determined at suitable intervals and the end point of the cook predicted and, if desired, confirmed, by procedure similar to that described with reference to Example 1, except that about 20 grams of the cook sample is preferably used with 80 grams of solvent to provide more definite light transmissibility measurements within the most reliable range of the instrument. If desired, amyl acetate or methyl ethyl ketone, for example, may be used in suitable concentrations as the solvent instead of butyl acetate. Target transmissibility of a butyl acetate suspension is about 80% when a 550 millimicron color filter is used with the light source.

Many additional examples may be given involving the use of a wide variety of base materials in which the polyamide resin is digested. The production control procedure, as described above, is substantially the same in all cases, the preferred proportion of cook sample to solvent varying somewhat and the end point target transmissibility depending upon the desired properties of the finished product. When bodied linseed oil is used as a base material with 10.8% polyamide resin, the 10% proportion of the cook sample is satisfactory, the target being about 82% for a butyl acetate suspension. With soya-modified, polymerized drying oil as the base material with 6.5% of polyamide resin, the 10% proportion is suitable and the target is about 73% transmissibility for a butyl acetate suspension.

It will be understood that the advantages of the invention are not limited in attainment to the use of solvents forming systems which follow Beer's law. Nitrobenzene, for example, appears to deviate somewhat, but otherwise qualifies as a useful solvent for the purposes of the invention. If desired, an experience curve can be pre-established with reefrence to each cook recipe to guide the operator in predicting end point time and checking progress of the cook.

Typical graphs prepared from actual light transmissibility measurements made in the course of typical commercial cooks are illustrated in the several figures of the drawings. Both Figs. 1 and 2 illustrate the typical linear relationship between the logarithm of the transmissibility of the butyl acetate solvent suspension when plotted against time of sampling. The base material was the same in the cook in each instance. It will be noted that the end point target of 80% was reached exactly 1 hour after the addition of the polyamide resin to the cook in the case of the batch represented by the graph of Fig. 1, while approximately 3 minutes less was required for the cook of Fig. 2.

Referring to Fig. 2, the graphs of two different solvent systems are shown for comparison. It will be noted that the slopes of the lines are somewhat different. It will also be noted that the end point target with reference to the amyl acetate system is about 68%, as compared with 80% for the butyl acetate solvent system.

For comparison purposes, duplicate determinations of light transmissibility were made for the cook of Fig. 1, mineral spirits being used instead of butyl acetate in one series of samplings. The light transmissibility measurements, made in the same way and on the same instrument as those plotted for the butyl acetate system, are plotted at the points indicated by the small square symbols. It is evident that these light measurements are erratic, furnishing little by way of useful information for the control of the cook. Tests have shown that even this erratic pattern is not duplicated in comparable cooks. Mineral spirits, and other liquids in which polyamide resin is practically insoluble hot as well as cold, are not satisfactory for use in the preparation of the sample suspensions to be measured for light transmissibility in practicing the method of the invention.

Invention is claimed as follows:

1. In the process for the production of a thixotropic vehicle for protective coatings by heating a reaction mixture comprised of a polyamide resin formed by the reaction of a polymerized unsaturated fatty acid with an alkylene polyamine, and an ester base selected from the group consisting of glyceride oils, oil-modified alkyl resins and varnish ester bodies, the method for determining the further reaction time required at a given temperature in order to obtain a product having properties the same as the properties of a standard thixotropic vehicle prepared from the same reactants, which comprises dissolving with heat a sample of the reaction mixture before the reaction end-point has been reached in a solvent in which both the ester base and the reaction product are soluble both when hot and when cold and which forms a solution therewith in which the unreacted polyamide resin is appreciably soluble hot but substantially insoluble cold, cooling the resulting solution to precipitate the unreacted polyamide resin contained therein to form a suspension thereof in the solution, measuring the light transmissibility of said suspension, reading the further reaction time required corresponding to said determined transmissibility value from a graph, and continuing the reaction until the further reaction time determined has elapsed, said graph having been plotted to show the relationship between reaction time and light transmissibility of test suspensions prepared from samples taken at intervals during the course of the reaction at said given temperature used to prepare said standard thixotropic vehicle whose properties are to be duplicated, said test suspensions having been prepared using the same solvent and in the same proportions as those used to prepare said first-described test suspension.

2. The method of claim 1 wherein said solvent is selected from the group consisting of nitrobenzene, butyl-acetate, amyl acetate, ethylene glycol monomethyl ether, ethylene glycol monoethyl ether, diethylene glycol monomethyl ether, diethylene glycol monoethyl ether, methyl ethyl ketone, ethylene glycol monoethyl ether acetate, tetrahydrofurfuryl alcohol and dipropylene glycol methyl ether.

3. The method of claim 1 wherein said solvent is butyl acetate.

4. In the production of a thixotropic vehicle for protective coatings by heating a reaction mixture comprised of a polyamide resin formed by the reaction of a polymerized unsaturated fatty acid with an alkylene polyamide, and an ester base selected from the group consisting of glyceride oils, oil-modified alkyd resins and varnish ester bodies, the method for predicting the reaction time required to attain an end product duplicating the properties of a standard thixotropic vehicle prepared from the same reactants, which comprises the steps of dissolving with heat a sample of the reaction mixture taken at a point before the reaction end-point has been reached in a solvent in which both the ester base and the reaction product are soluble both when hot and when cold, and which forms a solution therewith in which the unreacted polyamide resin is appreciably soluble hot but substantially insoluble cold, cooling the solution to precipitate the unreacted polyamide resin contained therein to form a suspension thereof in the solution, measuring the light transmissibility of said suspension, determining the further reaction time required corresponding to said light transmissibility on a standard graph, and continuing the reaction until the further reaction time determined has elapsed, said graph having been prepared by removing samples of the reaction mixture at various intervals during the reaction resulting in said thixotropic vehicle used as a standard, dissolving each sample in the same solvent and in the same proportions used to measure the light transmissibility of said first-described suspension, and plotting the values of the light transmissibility of the various test suspensions prepared against the reaction time required to attain such light transmissibility values.

5. In the process for the production of a thixotropic vehicle for protective coatings by heating a reaction mixture comprised of a polyamide resin formed by the reaction of a polymerized unsaturated fatty acid with an alkylene polyamine, and an ester base selected from the group consisting of glyceride oils, oil-modified alkyd resins and varnish ester bodies, the method for predicting the reaction time at which a product will be formed whose properties are the same as the properties of a thixotropic vehicle used as a standard, which comprises the steps of dissolving with heat at least two samples of the reaction mixture taken at different times during the course of the reaction before the end-point has been reached in a solvent in which both the ester base and the reaction product are soluble both when hot and when cold and which forms a solution therewith in which the unreacted polyamide resin is appreciably soluble hot but substantially insoluble cold, cooling each solution to precipitate the unreacted polyamide resin contained therein to form suspensions thereof, measuring the light transmissibility of each suspension, plotting the light transmissibility values thus determined on a graph having as coordinates light transmissibility and reaction time, extrapolating the curve defined by the plotted values to determine at what time a test suspension of said reaction product will have the same light transmissibility as that of a test suspension of said standard thixotropic vehicle prepared in the same solvent and same concentration and continuing the reaction until the further reaction time determined by extrapolation has elapsed.

6. The method of claim 5 wherein said solvent is selected from the group consisting of nitrobenzene, butyl acetate, amyl acetate, ethylene glycol monomethyl ether, ethylene glycol monoethyl ether, diethylene glycol monomethyl ether, diethylene glycol monoethyl ether, methyl ethyl ketone, ethylene glycol monoethyl ether acetate, tetrahydrofurfuryl alcohol and dipropylene glycol methyl ether.

7. The method of claim 5 wherein said solvent is butyl acetate.

8. In the process for the production of a thixotropic vehicle for protective coatings by heating a reaction mixture comprised of a polyamide resin formed by the reaction of a polymerized unsaturated fatty acid with an alkylene polyamine, and an ester base selected from the group consisting of glyceride oils, oil-modified alkyd resins and varnish ester bodies, the method for predicting the reaction time at which the reaction mixture will have properties substantially the same as the properties of a standard thixotropic vehicle prepared from the same reactants and in the same proportions, said method comprising the steps of preparing a standard test suspension by dissolving with heat a sample of said standard thixotropic vehicle in a solvent in which both the ester base and the reaction product are soluble both when hot and when cold and which forms a solution therewith in which the unreacted polyamide resin is appreciably soluble hot but substantially insoluble cold, cooling said solution to precipitate the unreacted polyamide resin contained therein to form a test suspension thereof, measuring the light transmissibility of said suspension, removing samples of said first named reaction mixture at at least two different times during the course of the reaction before the end-point has been reached, dissolving said samples in said solvent in the same proportions as used to determine the light transmissibility of said standard suspension, cooling said solutions and measuring the light transmissibility of each resulting suspension, relating each light transmissibility value to the time required to produce the reaction mixture from which it was taken, extrapolating the relationship to determine the additional reaction time required until the test suspension of a sample of said reaction mixture has the same light transmissibility as that of said standard test suspension, and continuing the reaction until the further reaction time determined by extrapolation has elapsed.

9. A method according to claim 1 wherein said polyamide resin is formed by the reaction of polymerized linoleic acid with an alkylene polyamine.

10. A method according to claim 4 wherein said polyamide resin is formed by the reaction of polymerized linoleic acid with an alkylene polyamine.

References Cited in the file of this patent

UNITED STATES PATENTS 2,663,649    Winkler _____ Sept. 22, 1953